US009638301B2

(12) United States Patent
Versteyhe et al.

(10) Patent No.: US 9,638,301 B2
(45) Date of Patent: May 2, 2017

(54) BALL TYPE CONTINUOUSLY VARIABLE TRANSMISSION

(71) Applicant: DANA LIMITED, Maumee, OH (US)

(72) Inventors: Mark R. J. Versteyhe, Oostkamp (BE); Thibaut E. Duchene, Woluwe-Saint-Lambert (BE); Matthias W. J. Byltiauw, Hooglede (BE)

(73) Assignee: Dana Limited, Maumee, OH (US)

(*) Notice: Subject to any disclaimer, the term of this patent is extended or adjusted under 35 U.S.C. 154(b) by 56 days.

(21) Appl. No.: 14/925,813

(22) Filed: Oct. 28, 2015

(65) Prior Publication Data

US 2016/0069442 A1 Mar. 10, 2016

Related U.S. Application Data

(63) Continuation of application No. 14/546,603, filed on Nov. 18, 2014, now Pat. No. 9,194,472, which is a continuation of application No. 14/208,364, filed on Mar. 13, 2014, now Pat. No. 8,926,468.

(60) Provisional application No. 61/786,299, filed on Mar. 14, 2013.

(51) Int. Cl.

| | |
|---|---|
| ***F16H 15/28*** | (2006.01) |
| ***F16H 37/02*** | (2006.01) |
| ***F16H 37/08*** | (2006.01) |
| ***F16H 15/50*** | (2006.01) |

(52) U.S. Cl.

CPC ......... *F16H 37/022* (2013.01); *F16H 15/503* (2013.01); *F16H 37/086* (2013.01); *F16H 15/28* (2013.01); *F16H 2037/026* (2013.01); *F16H 2037/088* (2013.01); *F16H 2037/0893* (2013.01); *F16H 2200/2005* (2013.01); *F16H 2200/2007* (2013.01)

(58) Field of Classification Search

CPC .... F16H 37/022; F16H 15/503; F16H 37/086; F16H 2037/088; F16H 2037/0893; F16H 2200/2007; F16H 2200/2005; F16H 2037/026; F16H 15/28

USPC ......................... 475/198, 204, 207, 214–217

See application file for complete search history.

(56) References Cited

U.S. PATENT DOCUMENTS

| | | | |
|---|---|---|---|
| 1,063,244 | A | 6/1913 | Ludwig |
| 1,215,969 | A | 2/1917 | Thomas |
| 1,526,140 | A | 2/1925 | Gruver |
| 2,019,006 | A | 10/1935 | Ferrarl |

(Continued)

FOREIGN PATENT DOCUMENTS

| | | | |
|---|---|---|---|
| AU | 2011224083 | A1 | 10/2011 |
| CN | 101392825 | A | 3/2009 |

(Continued)

OTHER PUBLICATIONS

PCT/US2014/036621 International Preliminary Report on Patentability dated Nov. 12, 2015.

(Continued)

*Primary Examiner* — Roger Pang
(74) *Attorney, Agent, or Firm* — Marshall & Melhorn, LLC

(57) ABSTRACT

A variable transmission includes an input shaft, a planetary gear set drivingly engaged with a variator comprising, a variator carrier assembly, a first ring assembly, and a second ring assembly; and the output shaft, arranged to produce transmissions with continuously variable or infinitely variable output ratios.

15 Claims, 9 Drawing Sheets

(56) References Cited

U.S. PATENT DOCUMENTS

| | | | |
|---|---|---|---|
| 2,060,884 | A | 11/1936 | Madle |
| 2,148,759 | A | 2/1939 | Grand |
| 2,405,201 | A | 8/1946 | Franck |
| 2,660,897 | A | 12/1953 | Neidhart et al. |
| 2,729,118 | A | 1/1956 | Emslie |
| 2,931,235 | A | 4/1960 | Hayward |
| 3,203,278 | A | 8/1965 | General |
| 3,376,633 | A | 4/1968 | Wesley |
| 3,407,687 | A | 10/1968 | Hayashi |
| 3,470,720 | A | 10/1969 | Phillip et al. |
| 3,505,718 | A | 4/1970 | Carl |
| 3,583,060 | A | 6/1971 | Maurice |
| 3,688,600 | A | 9/1972 | Allan |
| 3,765,270 | A | 10/1973 | Lemieux |
| 3,774,280 | A | 11/1973 | Eklund et al. |
| 3,831,245 | A | 8/1974 | Amos |
| 3,894,559 | A | 7/1975 | Depuy |
| 4,046,988 | A | 9/1977 | Okuda et al. |
| 4,187,709 | A | 2/1980 | Legate et al. |
| 4,226,140 | A | 10/1980 | Gaasenbeek |
| 4,333,358 | A | 6/1982 | Grattapaglia |
| 4,344,336 | A | 8/1982 | Carriere |
| 4,360,090 | A | 11/1982 | Wonn |
| 4,368,572 | A | 1/1983 | Kanazawa et al. |
| 4,464,952 | A | 8/1984 | Stubbs |
| 4,693,134 | A | 9/1987 | Kraus |
| 4,731,044 | A | 3/1988 | Mott |
| 4,756,211 | A | 7/1988 | Fellows |
| 4,784,017 | A | 11/1988 | Johnshoy |
| 4,856,371 | A | 8/1989 | Kemper |
| 4,856,374 | A | 8/1989 | Kreuzer |
| 4,950,208 | A | 8/1990 | Tomlinson |
| 4,963,122 | A | 10/1990 | Ryan |
| 4,963,124 | A | 10/1990 | Takahashi et al. |
| 5,109,962 | A | 5/1992 | Sato |
| 5,168,778 | A | 12/1992 | Todd et al. |
| 5,217,412 | A | 6/1993 | Indlekofer et al. |
| 5,230,670 | A | 7/1993 | Hibi |
| 5,238,460 | A | 8/1993 | Esaki et al. |
| 5,318,486 | A | 6/1994 | Lutz |
| 5,390,759 | A | 2/1995 | Gollner |
| 5,401,221 | A | 3/1995 | Fellows et al. |
| 5,520,588 | A | 5/1996 | Hall, III |
| 5,527,231 | A | 6/1996 | Seidel et al. |
| 5,577,423 | A | 11/1996 | Mimura |
| 5,599,251 | A | 2/1997 | Beim et al. |
| 5,659,956 | A | 8/1997 | Braginsky et al. |
| 5,683,322 | A | 11/1997 | Meyerle |
| 5,726,353 | A | 3/1998 | Matsuda et al. |
| 5,730,678 | A | 3/1998 | Larkin |
| 5,766,105 | A | 6/1998 | Fellows et al. |
| 5,776,028 | A | 7/1998 | Matsuda et al. |
| 5,800,303 | A | 9/1998 | Benford |
| 5,860,888 | A | 1/1999 | Lee |
| 5,915,801 | A | 6/1999 | Taga et al. |
| 5,961,415 | A | 10/1999 | Justice et al. |
| 5,971,883 | A | 10/1999 | Klemen |
| 5,996,226 | A | 12/1999 | Gibbs |
| 6,009,365 | A | 12/1999 | Takahara et al. |
| 6,036,616 | A | 3/2000 | McCarrick et al. |
| 6,045,477 | A | 4/2000 | Schmidt |
| 6,053,839 | A | 4/2000 | Baldwin et al. |
| 6,059,685 | A | 5/2000 | Hoge et al. |
| 6,071,208 | A | 6/2000 | Koivunen |
| 6,080,080 | A | 6/2000 | Bolz et al. |
| 6,083,135 | A | 7/2000 | Baldwin et al. |
| 6,086,504 | A | 7/2000 | Illerhaus |
| 6,089,287 | A | 7/2000 | Welsh et al. |
| 6,095,942 | A | 8/2000 | Yamaguchi et al. |
| 6,155,951 | A | 12/2000 | Kuhn et al. |
| 6,203,466 | B1 * | 3/2001 | Ishikawa ............... F16H 37/086 475/216 |
| 6,217,474 | B1 | 4/2001 | Ross et al. |
| 6,251,038 | B1 | 6/2001 | Ishikawa et al. |
| 6,273,838 | B1 | 8/2001 | Park |
| 6,342,026 | B1 | 1/2002 | Takagi et al. |
| 6,358,178 | B1 | 3/2002 | Wittkopp |
| 6,371,880 | B1 | 4/2002 | Kam |
| 6,481,258 | B1 | 11/2002 | Belinky |
| 6,554,735 | B2 | 4/2003 | Kanazawa |
| 6,558,285 | B1 | 5/2003 | Sieber |
| 6,585,619 | B2 | 7/2003 | Henzler |
| 6,609,994 | B2 | 8/2003 | Muramoto |
| 6,632,157 | B1 | 10/2003 | Gierling et al. |
| 6,641,497 | B2 | 11/2003 | Deschamps et al. |
| 6,645,106 | B2 | 11/2003 | Goo et al. |
| 6,689,012 | B2 | 2/2004 | Miller et al. |
| 6,705,964 | B2 | 3/2004 | Nagai et al. |
| 6,719,659 | B2 | 4/2004 | Geiberger et al. |
| 6,723,016 | B2 | 4/2004 | Sumi |
| 6,726,590 | B2 | 4/2004 | Henzler et al. |
| 6,733,412 | B2 | 5/2004 | Kumagai et al. |
| 6,752,696 | B2 | 6/2004 | Murai et al. |
| 6,793,603 | B2 | 9/2004 | Teraoka et al. |
| 6,849,020 | B2 | 2/2005 | Sumi |
| 6,866,606 | B2 | 3/2005 | Ooyama |
| 6,949,045 | B2 | 9/2005 | Wafzig et al. |
| 6,979,275 | B2 | 12/2005 | Hiraku et al. |
| 6,986,725 | B2 | 1/2006 | Morscheck |
| 7,033,298 | B2 | 4/2006 | Usoro et al. |
| 7,074,154 | B2 | 7/2006 | Miller |
| 7,086,981 | B2 | 8/2006 | Ali et al. |
| 7,104,917 | B2 | 9/2006 | Klemen et al. |
| 7,128,681 | B2 | 10/2006 | Sugino et al. |
| 7,160,220 | B2 | 1/2007 | Shinojima et al. |
| 7,186,199 | B1 | 3/2007 | Baxter, Jr. |
| 7,217,214 | B2 | 5/2007 | Morscheck et al. |
| 7,234,543 | B2 | 6/2007 | Schaaf |
| 7,288,044 | B2 | 10/2007 | Gumpoltsberger |
| 7,311,634 | B2 | 12/2007 | Shim et al. |
| 7,335,126 | B2 | 2/2008 | Tsuchiya et al. |
| 7,347,801 | B2 | 3/2008 | Guenter et al. |
| 7,396,309 | B2 | 7/2008 | Heitz et al. |
| 7,431,677 | B2 | 10/2008 | Miller et al. |
| 7,470,210 | B2 | 12/2008 | Miller et al. |
| 7,473,202 | B2 | 1/2009 | Morscheck et al. |
| 7,485,069 | B2 | 2/2009 | Jang et al. |
| 7,497,798 | B2 | 3/2009 | Kim |
| 7,588,514 | B2 | 9/2009 | McKenzie et al. |
| 7,637,838 | B2 | 12/2009 | Gumpoltsberger |
| 7,672,770 | B2 | 3/2010 | Inoue et al. |
| 7,686,729 | B2 | 3/2010 | Miller et al. |
| 7,717,815 | B2 | 5/2010 | Tenberge |
| 7,727,107 | B2 | 6/2010 | Miller |
| 7,780,566 | B2 | 8/2010 | Seo |
| 7,874,153 | B2 | 1/2011 | Behm |
| 7,878,935 | B2 | 2/2011 | Lahr |
| 7,951,035 | B2 | 5/2011 | Platt |
| 7,980,972 | B1 | 7/2011 | Starkey et al. |
| 8,029,401 | B2 | 10/2011 | Johnson |
| 8,052,569 | B2 | 11/2011 | Tabata et al. |
| 8,062,175 | B2 | 11/2011 | Krueger et al. |
| 8,066,614 | B2 | 11/2011 | Miller et al. |
| 8,142,323 | B2 | 3/2012 | Tsuchiya et al. |
| 8,226,518 | B2 | 7/2012 | Parraga |
| 8,257,216 | B2 | 9/2012 | Hoffman |
| 8,257,217 | B2 | 9/2012 | Hoffman |
| 8,287,414 | B2 | 10/2012 | Weber et al. |
| 8,313,404 | B2 | 11/2012 | Carter et al. |
| 8,376,903 | B2 | 2/2013 | Pohl et al. |
| 8,382,636 | B2 | 2/2013 | Shiina et al. |
| 8,447,480 | B2 | 5/2013 | Usukura |
| 8,469,856 | B2 | 6/2013 | Thomassy |
| 8,545,368 | B1 | 10/2013 | Davis et al. |
| 8,594,867 | B2 | 11/2013 | Heap et al. |
| 8,622,871 | B2 | 1/2014 | Hoff |
| 8,639,419 | B2 | 1/2014 | Roli et al. |
| 8,668,614 | B2 | 3/2014 | Sherrill et al. |
| 8,678,975 | B2 | 3/2014 | Koike |
| 8,870,711 | B2 | 10/2014 | Pohl et al. |
| 8,888,643 | B2 | 11/2014 | Lohr et al. |
| 8,926,468 | B2 | 1/2015 | Versteyhe et al. |
| 8,986,150 | B2 | 3/2015 | Versteyhe et al. |
| 9,052,000 | B2 | 6/2015 | Cooper |

(56) References Cited

U.S. PATENT DOCUMENTS

| | | | |
|---|---|---|---|
| 9,114,799 | B2 | 8/2015 | Tsukamoto et al. |
| 9,156,463 | B2 | 10/2015 | Legner et al. |
| 2002/0004438 | A1 | 1/2002 | Toukura et al. |
| 2002/0094911 | A1 | 7/2002 | Haka |
| 2003/0181280 | A1 | 9/2003 | Elser et al. |
| 2003/0200783 | A1 | 10/2003 | Shai |
| 2003/0213125 | A1 | 11/2003 | Chiuchang |
| 2003/0216121 | A1 | 11/2003 | Yarkosky |
| 2003/0228952 | A1 | 12/2003 | Joe et al. |
| 2004/0058769 | A1 | 3/2004 | Larkin |
| 2004/0061639 | A1 | 4/2004 | Voigtlaender et al. |
| 2004/0166984 | A1 | 8/2004 | Inoue |
| 2004/0167391 | A1 | 8/2004 | Solar et al. |
| 2004/0171452 | A1 | 9/2004 | Miller et al. |
| 2005/0102082 | A1 | 5/2005 | Joe et al. |
| 2005/0137046 | A1 | 6/2005 | Miller et al. |
| 2005/0153810 | A1 | 7/2005 | Miller et al. |
| 2005/0164818 | A1* | 7/2005 | Kimura .................. F16D 33/14 475/59 |
| 2006/0094515 | A1 | 5/2006 | Szuba et al. |
| 2006/0276294 | A1 | 12/2006 | Coffey et al. |
| 2007/0032327 | A1 | 2/2007 | Raghavan et al. |
| 2007/0042856 | A1 | 2/2007 | Greenwood et al. |
| 2007/0072732 | A1 | 3/2007 | Klemen |
| 2007/0096556 | A1 | 5/2007 | Kokubo et al. |
| 2007/0270270 | A1 | 11/2007 | Miller et al. |
| 2007/0275808 | A1 | 11/2007 | Iwanaka et al. |
| 2008/0039273 | A1 | 2/2008 | Smithson et al. |
| 2008/0103002 | A1 | 5/2008 | Holmes |
| 2008/0185201 | A1 | 8/2008 | Bishop |
| 2009/0017959 | A1 | 1/2009 | Triller |
| 2009/0062064 | A1 | 3/2009 | Kamada et al. |
| 2009/0132135 | A1 | 5/2009 | Quinn, Jr. et al. |
| 2009/0221391 | A1 | 9/2009 | Bazyn et al. |
| 2009/0221393 | A1 | 9/2009 | Kassler |
| 2009/0286651 | A1 | 11/2009 | Tanaka et al. |
| 2009/0312137 | A1 | 12/2009 | Rohs et al. |
| 2010/0056322 | A1 | 3/2010 | Thomassy |
| 2010/0093479 | A1 | 4/2010 | Carter et al. |
| 2010/0106386 | A1 | 4/2010 | Krasznai et al. |
| 2010/0113211 | A1 | 5/2010 | Schneider et al. |
| 2010/0137094 | A1 | 6/2010 | Pohl |
| 2010/0141193 | A1 | 6/2010 | Rotondo et al. |
| 2010/0244755 | A1 | 9/2010 | Kinugasa et al. |
| 2010/0267510 | A1 | 10/2010 | Nichols et al. |
| 2010/0282020 | A1 | 11/2010 | Greenwood et al. |
| 2010/0304915 | A1 | 12/2010 | Lahr |
| 2010/0310815 | A1 | 12/2010 | Mendonca et al. |
| 2011/0015021 | A1 | 1/2011 | Maguire et al. |
| 2011/0034284 | A1 | 2/2011 | Pohl et al. |
| 2011/0152031 | A1 | 6/2011 | Schoolcraft |
| 2011/0165982 | A1 | 7/2011 | Hoffman et al. |
| 2011/0165985 | A1 | 7/2011 | Hoffman et al. |
| 2011/0165986 | A1 | 7/2011 | Hoffman et al. |
| 2011/0230297 | A1 | 9/2011 | Shiina et al. |
| 2011/0300954 | A1 | 12/2011 | Szuba et al. |
| 2011/0319222 | A1 | 12/2011 | Ogawa et al. |
| 2012/0024991 | A1 | 2/2012 | Pilch et al. |
| 2012/0035016 | A1 | 2/2012 | Miller et al. |
| 2012/0040794 | A1 | 2/2012 | Schoolcraft |
| 2012/0122624 | A1 | 5/2012 | Hawkins, Jr. et al. |
| 2012/0142477 | A1 | 6/2012 | Winter |
| 2012/0165154 | A1 | 6/2012 | Wittkopp et al. |
| 2012/0244990 | A1 | 9/2012 | Ogawa et al. |
| 2012/0309579 | A1 | 12/2012 | Miller et al. |
| 2013/0130859 | A1 | 5/2013 | Lundberg et al. |
| 2013/0133965 | A1 | 5/2013 | Books |
| 2013/0184115 | A1 | 7/2013 | Urabe et al. |
| 2013/0190131 | A1 | 7/2013 | Versteyhe et al. |
| 2013/0226416 | A1 | 8/2013 | Seipold et al. |
| 2013/0303325 | A1 | 11/2013 | Carey et al. |
| 2013/0304344 | A1 | 11/2013 | Abe |
| 2013/0338888 | A1 | 12/2013 | Long et al. |
| 2014/0223901 | A1 | 8/2014 | Versteyhe et al. |
| 2014/0274540 | A1 | 9/2014 | Schoolcraft |
| 2014/0274552 | A1 | 9/2014 | Frink et al. |
| 2014/0329637 | A1 | 11/2014 | Thomassy et al. |
| 2015/0024899 | A1 | 1/2015 | Phillips |
| 2015/0051801 | A1 | 2/2015 | Quinn, Jr. et al. |
| 2015/0111683 | A1 | 4/2015 | Versteyhe et al. |
| 2015/0142281 | A1 | 5/2015 | Versteyhe et al. |
| 2015/0159741 | A1 | 6/2015 | Versteyhe et al. |
| 2015/0204429 | A1 | 7/2015 | Versteyhe et al. |
| 2015/0204430 | A1 | 7/2015 | Versteyhe |
| 2015/0226294 | A1 | 8/2015 | Ziech et al. |
| 2015/0226298 | A1 | 8/2015 | Versteyhe |
| 2015/0226299 | A1 | 8/2015 | Cooper et al. |
| 2015/0252881 | A1 | 9/2015 | Versteyhe |
| 2015/0354676 | A1 | 12/2015 | Versteyhe et al. |
| 2016/0033021 | A1 | 2/2016 | Cooper et al. |
| 2016/0047448 | A1 | 2/2016 | Versteyhe et al. |
| 2016/0109001 | A1 | 4/2016 | Schoolcraft |
| 2016/0123438 | A1 | 5/2016 | Ziech et al. |
| 2016/0131235 | A1 | 5/2016 | Phillips |
| 2016/0185353 | A1 | 6/2016 | Honma et al. |
| 2016/0281828 | A1 | 9/2016 | Haka |
| 2016/0290458 | A1 | 10/2016 | Taskiran et al. |

FOREIGN PATENT DOCUMENTS

| | | | |
|---|---|---|---|
| CN | 101617146 | A | 12/2009 |
| CN | 202165536 | U | 3/2012 |
| DE | 1237380 | B | 3/1967 |
| DE | 3245045 | A1 | 6/1984 |
| DE | 102005010751 | A1 | 9/2006 |
| EP | 0156936 | A1 | 10/1985 |
| EP | 0210053 | A2 | 1/1987 |
| EP | 1061288 | A2 | 12/2000 |
| EP | 2113056 | B1 | 7/2012 |
| FR | 796188 | A | 3/1936 |
| FR | 1030702 | A | 6/1953 |
| FR | 1472282 | A | 3/1967 |
| FR | 2185076 | A5 | 12/1973 |
| FR | 2280451 | A1 | 2/1976 |
| FR | 2918433 | A1 | 1/2009 |
| GB | 1127825 | A | 9/1968 |
| GB | 2196892 | A | 5/1988 |
| GB | 2248895 | A | 4/1992 |
| JP | H09119506 | A | 5/1997 |
| JP | 2008180214 | A | 8/2008 |
| JP | 2009058085 | A | 3/2009 |
| JP | 2011153583 | A | 8/2011 |
| WO | WO-2006002457 | A1 | 1/2006 |
| WO | WO-2006041718 | A2 | 4/2006 |
| WO | WO-2007046722 | A1 | 4/2007 |
| WO | WO-2007051827 | A1 | 5/2007 |
| WO | WO-2008103543 | A1 | 8/2008 |
| WO | WO-2011011991 | A1 | 2/2011 |
| WO | WO-2012008884 | A1 | 1/2012 |
| WO | WO-2012177187 | A1 | 12/2012 |
| WO | WO-2013109723 | A1 | 7/2013 |
| WO | WO-2013123117 | A1 | 8/2013 |
| WO | WO-2014039438 | A2 | 3/2014 |
| WO | WO-2014039439 | A1 | 3/2014 |
| WO | WO-2014039440 | A1 | 3/2014 |
| WO | WO-2014039447 | A1 | 3/2014 |
| WO | WO-2014039448 | A2 | 3/2014 |
| WO | WO-2014039708 | A1 | 3/2014 |
| WO | WO-2014039713 | A1 | 3/2014 |
| WO | WO-2014039846 | A2 | 3/2014 |
| WO | WO-2014039900 | A1 | 3/2014 |
| WO | WO-2014039901 | A1 | 3/2014 |
| WO | WO-2014078583 | A1 | 5/2014 |
| WO | WO-2014124291 | A1 | 8/2014 |
| WO | WO-2014151889 | A2 | 9/2014 |
| WO | WO-2014159755 | A2 | 10/2014 |
| WO | WO-2014159756 | A2 | 10/2014 |
| WO | WO-2014165259 | A1 | 10/2014 |
| WO | WO-2014179717 | A1 | 11/2014 |
| WO | WO-2014179719 | A1 | 11/2014 |
| WO | WO-2014186732 | A1 | 11/2014 |
| WO | WO-2014197711 | A1 | 12/2014 |
| WO | WO-2015059601 | A1 | 4/2015 |
| WO | WO-2015073883 | A1 | 5/2015 |

(56) References Cited

FOREIGN PATENT DOCUMENTS

| | | | |
|---|---|---|---|
| WO | WO-2015073887 | A1 | 5/2015 |
| WO | WO-2015073948 | A2 | 5/2015 |
| WO | WO-2015195759 | A2 | 12/2015 |
| WO | WO-2015200769 | A1 | 12/2015 |
| WO | WO-2016094254 | A1 | 6/2016 |

OTHER PUBLICATIONS

PCT/US2014/036623 International Preliminary Report on Patentability dated Nov. 12, 2015.
PCT/US2014/038439 International Preliminary Report on Patentability dated Nov. 26, 2015.
PCT/US2014/065796 International Preliminary Report on Patentability dated Nov. 6, 2015.
PCT/US2014/065909 Written Opinion dated Dec. 11, 2015.
U.S. Appl. No. 14/175,584 Office Action dated Dec. 3, 2015.
U.S. Appl. No. 14/210,130 Office Action dated Nov. 20, 2015.
U.S. Appl. No. 14/542,336 Office Action dated Nov. 25, 2015.
PCT/US2014/041124 International Preliminary Report on Patentability dated Dec. 17, 2015.
PCT/US2015/36170 International Search Report and Written Opinion dated Dec. 17, 2015.
PCT/US2015/64087 International Search Report and Written Opinion dated Feb. 11, 2016.
U.S. Appl. No. 13/743,951 Office Action dated Jan. 21, 2016.
Co-pending U.S. Appl. No. 15/067,427, filed Mar. 11, 2016.
Co-pending U.S. Appl. No. 15/067,752, filed Mar. 11, 2016.
U.S. Appl. No. 14/210,130 Office Action dated Jun. 7, 2016.
U.S. Appl. No. 14/378,750 Office Action dated Apr. 8, 2016.
U.S. Appl. No. 14/425,600 Office Action dated May 16, 2016.
PCT/US2014/065792 International Preliminary Report on Patentability dated Jun. 2, 2016.
PCT/US2014/065909 Written Opinion dated Jun. 6, 2016.
PCT/US2016/027496 International Search Report and Written Opinion dated Jul. 8, 2016.
U.S. Appl. No. 14/425,598 Office Action dated Jun. 14, 2016.
U.S. Appl. No. 14/425,842 Office Action dated Jul. 1, 2016.
U.S. Appl. No. 15/067,752 Office Action dated Jun. 30, 2016.
Co-pending U.S. Appl. No. 15/209,487, filed Jul. 13, 2016.
Co-pending U.S. Appl. No. 15/215,179, filed Jul. 20, 2016.
PCT/US2016/29853 International Search Report and Written Opinion dated Aug. 8, 2016.
U.S. Appl. No. 14/334,538 Office Action dated Jul. 29, 2016.
Co-pending U.S. Appl. No. 15/260,472, filed Sep. 9, 2016.
Co-pending U.S. Appl. No. 15/265,163, filed Sep. 14, 2016.
Co-pending U.S. Appl. No. 15/265,226, filed Sep. 14, 2016.
Co-pending U.S. Appl. No. 15/272,774, filed Sep. 22, 2016.
Co-pending U.S. Appl. No. 15/284,940, filed Oct. 4, 2016.
PCT/US2016/030930 International Search Report and Written Opinion dated Sep. 23, 2016.
PCT/US2016/038064 International Search Report and Written Opinion dated Sep. 7, 2016.
U.S. Appl. No. 14/425,600 Office Action dated Sep. 23, 2016.
U.S. Appl. No. 62/158,847, filed May 8, 2015.
Fallbrook Technologies. 'NuVinci® Technology', Feb. 26, 2013; [retrieved on Jun. 5, 2014]. Retrieved from internet: &It;URL: https://web.archive.org/web/20130226233109/http://www.fallbrooktech.com/nuvinci-technology.
Moore et al. A Three Revolute Cobot Using CVTs in Parallel, Proceedings of IMECE, 1999, 6 pgs.
PCT/US2013/021890 International Preliminary Report on Patentability dated Jul. 31, 2014.
PCT/US2013/021890 International Search Report dated Apr. 10, 2013.
PCT/US2013/026037 International Preliminary Report on Patentability dated Aug. 28, 2014.
PCT/US2013/026037 International Search Report dated Jul. 15, 2013.
PCT/US2013/057837 International Preliminary Report on Patentability dated Mar. 19, 2015.
PCT/US2013/057837 International Search Report and Written Opinion dated Mar. 31, 2014.
PCT/US2013/057838 International Preliminary Report on Patentability dated Mar. 19, 2015.
PCT/US2013/057838 International Search Report and Written Opinion dated Jan. 17, 2014.
PCT/US2013/057839 International Preliminary Report on Patentability dated Mar. 19, 2015.
PCT/US2013/057839 International Search Report and Written Opinion dated Feb. 6, 2014.
PCT/US2013/057866 International Preliminary Report on Patentability dated Mar. 19, 2015.
PCT/US2013/057866 International Search Report dated Feb. 11, 2014.
PCT/US2013/057868 International Preliminary Report on Patentability dated Mar. 19, 2015.
PCT/US2013/057868 International Search Report and Written Opinion dated Apr. 9, 2014.
PCT/US2013/058309 International Preliminary Report on Patentability dated Mar. 19, 2015.
PCT/US2013/058309 International Search Report and Written Opinion dated Feb. 11, 2014.
PCT/US2013/058318 International Preliminary Report on Patentability dated Mar. 19, 2015.
PCT/US2013/058318 International Search Report and Written Opinion dated Feb. 11, 2014.
PCT/US2013/058545 International Preliminary Report on Patentability dated Mar. 19, 2015.
PCT/US2013/058545 International Search Report and Written Opinion dated Feb. 19, 2014.
PCT/US2013/058615 International Preliminary Report on Patentability dated Mar. 19, 2015.
PCT/US2013/058615 International Search Report and Written Opinion dated Feb. 11, 2014.
PCT/US2013/058616 International Preliminary Report on Patentability dated Mar. 19, 2015.
PCT/US2013/058616 International Search Report and Written Opinion dated Feb. 11, 2014.
PCT/US2013/070177 International Preliminary Report on Patentability dated May 28, 2015.
PCT/US2013/070177 International Search Report and Written Opinion dated Apr. 14, 2014.
PCT/US2014/015352 International Search Report and Written Opinion dated May 27, 2014.
PCT/US2014/025001 International Preliminary Report on Patent ability dated Sep. 24, 2015.
PCT/US2014/025001 International Search Report and Written Opinion dated Jul. 14, 2014.
PCT/US2014/025004 International Search Report and Written Opinion dated Jul. 14, 2014.
PCT/US2014/025004 International Preliminary Report on Patentability dated Oct. 1, 2015.
PCT/US2014/025005 International Preliminary Report on Patentability dated Oct. 1, 2015.
PCT/US2014/025005 International Search Report and Written Opinion dated Jul. 14, 2014.
PCT/US2014/026619 International Preliminary Report on Patentability dated Sep. 24, 2015.
PCT/US2014/026619 International Search Report and Written Opinion dated Sep. 9, 2014.
PCT/US2014/036621 International Search Report and Written Opinion dated Sep. 4, 2014.
PCT/US2014/036623 International Search Report and Written Opinion dated Sep. 4, 2014.
PCT/US2014/038439 International Search Report and Written Opinion dated Sep. 30, 2014.
PCT/US2014/041124 International Search Report and Written Opinion dated Oct. 15, 2014.
PCT/US2014/065792 International Search Report and Written Opinion dated Apr. 9, 2015.

(56) References Cited

OTHER PUBLICATIONS

PCT/US2014/065796 International Search Report and Written Opinion dated Apr. 9, 2015.
PCT/US2014/065909 International Search Report and Written Opinion dated Feb. 19, 2015.
PCT/US2015/37916 International Search Report and Written Opinion dated Sep. 29, 2015.
U.S. Appl. No. 13/743,951 Office Action dated Aug. 19, 2015.
U.S. Appl. No. 13/743,951 Office Action dated Mar. 18, 2015.
U.S. Appl. No. 14/017,054 Office Action dated Aug. 27, 2014.
U.S. Appl. No. 14/017,054 Office Action dated Dec. 12, 2014.
U.S. Appl. No. 14/175,584 Office Action dated Apr. 2, 2015.
U.S. Appl. No. 14/426,139 Office Action dated Oct. 6, 2015.
U.S. Appl. No. 60/616,399, filed Oct. 5, 2004.
U.S. Appl. No. 61/819,414, filed May 3, 2013.
Wong. The Temple of VTEC Asia Special Focus on the Multimatic Transmission. Temple of VTEC Asia. 2000.

* cited by examiner

BALL TYPE CONTINUOUSLY VARIABLE TRANSMISSION

CROSS-REFERENCE TO RELATED APPLICATIONS

The present application is a continuation of U.S. application Ser. No. 14/546,603, filed Nov. 18, 2014, which is a continuation of U.S. application Ser. No. 14/208,364, filed Mar. 13, 2014, now issued as U.S. Pat. No. 8,926,468 on Jan. 6, 2015, which claims priority to U.S. Provisional Patent Application No. 61/786,299, filed Mar. 14, 2013 each of which are incorporated herein by reference in their entireties.

BACKGROUND OF THE INVENTION

Automatic and manual transmissions are commonly used on automobile vehicles. Those transmissions are becoming more and more complicated since the engine speed has to be more precisely controlled to limit the fuel consumption and the emissions of cars. This finer control of the engine speed in usual transmissions can only be done by adding more discrete step ratio gears and increasing the overall complexity and cost. Consequently, 6-speed manual transmissions then become more frequently used as are 8 or 9 speed automatic transmissions.

SUMMARY OF THE INVENTION

Provided herein is a variable transmission comprising: an input shaft; a variator (CVP) comprising a first ring assembly coupled to the input shaft, a carrier assembly comprising a plurality of tiltable variator balls drivingly engaged with the first ring assembly, and a second ring assembly drivingly engaged with the tiltable variator balls; and a planetary gearset comprising a planet carrier drivingly engaged with the input shaft, a ring drivingly engaged with the second ring assembly of the variator, and a sun gear drivingly engaged with the output of the vehicle; wherein the planetary gearset is configured to split power of the input shaft between the variator and a mechanical path going directly to the output through the planetary gear set.

In some embodiments, the first ring assembly and the second ring assembly are drivingly coupled over a continuous range of speed ratios from a minimum speed ratio to a maximum speed ratio, and wherein the speed ratio is controlled by tiltable variator balls. In some embodiments, the variator controls the speed ratio between the two ring assembly of the variator, and thus between the planet carrier and ring of the planetary gearset. In some embodiments, a minimum speed ratio and a maximum speed ratio between the ICE and sun of the planetary gearset (output) span a range from negative to positive.

In some embodiments, the variable transmission comprises a dampener (or damper) coupled to the input shaft and disposed between a power source and the variable transmission.

In some embodiments, the variable transmission comprises a clutch in the driveline. In some embodiments, the variable transmission might comprise a clutch coupled to the dampener or at any other location to allow interrupting power transmission through the driveline.

In some embodiments, the variable transmission comprises an additional speed ratio configured to shift a range of speed ratios to high or lower values. In some embodiments, the speed ratio shifter comprises a countershaft and gear drivingly engaged with the first ring assembly, the countershaft and gear having a gear ratio that changes the speed ratio between the input shaft and the second ring assembly. In some embodiments, the speed ratio shifter is made of a planetary of which one element is grounded. In some embodiments, shifting the range of speed ratios to higher ratios shifts the range of speed ratios between the planet carrier and sun of the planetary gearset to lower ratios. In some embodiments, the range of speed ratios is such that the range of speed ratios between the ICE and the sun or output spans a negative ratio to a positive ratio. In some embodiments, the range of speed ratios is such that the range of speed ratios between the input shaft and the sun or output spans a negative ratio to a positive ratio, the negative ratio having equal magnitude as the positive ratio.

In some embodiments, the variable transmission comprises an additional speed ratio configured to shift a range of speed ratios to high or lower values. In some embodiments, the speed ratio shifter comprises a planetary gear set of which one of the elements (for example the ring) has been grounded to create a speed ratio between the two other elements (for example sun and planet carrier). The two elements not grounded are connected to the input shaft and the first ring assembly. In some embodiments, shifting the range of speed ratios to higher ratios shifts the range of speed ratios between the planet carrier and sun of the planetary gearset to lower ratios. In some embodiments, the range of speed ratios is such that the range of speed ratios between the ICE and the sun or output spans a negative ratio to a positive ratio. In some embodiments, the range of speed ratios is such that the range of speed ratios between the ICE and the sun or output spans a negative ratio to a positive ratio, the negative ratio having equal magnitude as the positive ratio.

In some embodiments, the variator is an asymmetric variator. In some embodiments, the asymmetric variator performs the function of the speed ratio shifter. In some embodiments, the first ring assembly comprises a first ring assembly engagement portion that is drivingly engaged with the variator balls, and second ring assembly comprises a second ring assembly engagement portion that is drivingly engaged with the variator balls, and wherein the first ring assembly engagement portion is offset from the second ring assembly engagement portion such that the speed ratio is greater than 1 or less than 1 when the variator balls are not tilted.

In some embodiments, the variator comprises a traction fluid.

Provided herein is a vehicle driveline comprising: a power source, a variable transmission of any configuration described herein or that would be obvious to one of skill in the art having read the disclosure herein. The variable transmission of the vehicle driveline is optionally drivingly engaged with the power source, and a vehicle output drivingly engaged with the variable transmission.

In some embodiments, the power source is drivingly engaged with the vehicle output. In some embodiments, the vehicle driveline comprises a torsional dampener. In some embodiments, the vehicle driveline comprises a clutch. In some embodiments, the vehicle driveline comprises a variable transmission of any configuration described herein or that would be obvious to one of skill in the art having read the disclosure herein.

Provided herein is a method comprising providing a variable transmission of any configuration described herein or that would be obvious to one of skill in the art having read the disclosure herein.

Provided herein is a method comprising providing a vehicle driveline comprising a variable transmission of any configuration described herein or that would be obvious to one of skill in the art having read the disclosure herein.

Provided herein is a method comprising providing a vehicle comprising a variable transmission of any configuration described herein or that would be obvious to one of skill in the art having read the disclosure herein. Provided herein are variable transmissions comprising: an input shaft; a variator (CVP) comprising a first ring assembly coupled to the input shaft, a carrier assembly comprising a plurality of tiltable variator balls drivingly engaged with the first ring assembly, and a second ring assembly drivingly engaged with the tiltable variator balls; and a planetary gearset comprising a planet carrier drivingly engaged with the input shaft, a ring drivingly engaged with the second ring assembly of the variator, and a sun gear drivingly engaged with the output of the vehicle, wherein the planetary gearset is configured to split power of the input shaft between the variator and a mechanical path going directly to the output through the planetary gear set. In some embodiments, the first ring assembly and the second ring assembly are drivingly coupled over a continuous range of speed ratios from a minimum speed ratio to a maximum speed ratio, and wherein the speed ratio is controlled by the tiltable variator balls. In some embodiments, the tiltable variator balls controls the speed ratio between the first ring assembly and second ring assembly of the variator, and thereby controls the speed ratio between the planet carrier and ring of the planetary gearset. In some embodiments, a minimum speed ratio and a maximum speed ratio between the input shaft and the sun of the planetary gearset span a range from negative to positive. In some embodiments, the variable transmission further comprises a damper coupled to the input shaft and disposed between a power source and the variable transmission. In some embodiments, the variable transmission further comprises a clutch disposed between the power source and the variable transmission. In some embodiments, the clutch is coupled to the damper or at a location to allow interrupting power transmission. In some embodiments, the variable transmission further comprises a speed ratio shifter configured to shift a range of speed ratios to high or lower values. In some embodiments, the speed ratio shifter comprises a countershaft and gear drivingly engaged with the first ring assembly, the countershaft and gear having a gear ratio that shifts the speed ratio between the input shaft and the second ring assembly. In some embodiments, the speed ratio shifter comprises a planetary gearset, a portion of which is grounded. In some embodiments, shifting the range of speed ratios to higher ratios shifts the range of speed ratios between the planet carrier and sun of the planetary gearset to lower ratios. In some embodiments, the range of speed ratios is such that the range of speed ratios between the input shaft and the sun or output spans a negative ratio to a positive ratio. In some embodiments, the range of speed ratios is such that the range of speed ratios between the input shaft and the sun or output spans a negative ratio to a positive ratio, the negative ratio having equal magnitude as the positive ratio. In some embodiments, the variable transmission further comprises a second speed ratio shifter configured to shift a range of speed ratios to high or lower values. In some embodiments, the second speed ratio shifter comprises a planetary gear set comprising a sun, a ring and a gear, one of which is grounded to create a speed ratio. In some embodiments, two of the sun, the ring, and the gear, are not grounded and are connected to the input shaft and the first ring assembly. In some embodiments, shifting the range of speed ratios to higher ratios shifts the range of speed ratios between the planet carrier and sun of the planetary gearset to lower ratios. In some embodiments, the range of speed ratios is such that the range of speed ratios between the input shaft and the sun or output spans a negative ratio to a positive ratio. In some embodiments, the range of speed ratios is such that the range of speed ratios between the input shaft and the sun or output spans a negative ratio to a positive ratio, the negative ratio having equal magnitude as the positive ratio. In some embodiments, the variator is an asymmetric variator. In some embodiments, the asymmetric variator performs the function of the speed ratio shifter. In some embodiments, the first ring assembly comprises a first ring assembly engagement portion that is drivingly engaged with the tiltable variator balls, and second ring assembly comprises a second ring assembly engagement portion that is drivingly engaged with the tiltable variator balls, and wherein the first ring assembly engagement portion is offset from the second ring assembly engagement portion such that the speed ratio is greater than 1 or less than 1 when the tiltable variator balls are not tilted. In some embodiments, the variator comprises a traction fluid.

Provided herein are vehicle drivelines comprising: a power source, any variable transmission of any configuration described herein or that would be obvious to one of skill in the art having read the disclosure herein drivingly engaged with the power source, and a vehicle output drivingly engaged with the variable transmission. In some embodiments, the power source is drivingly engaged with the vehicle output. In some embodiments, the vehicle driveline comprises a torsional dampener. In some embodiments, the vehicle driveline comprises a clutch.

Provided herein are vehicles comprising a variable transmission of any configuration described herein or that would be obvious to one of skill in the art having read the disclosure herein.

Provided herein are methods comprising providing a variable transmission of any configuration described herein or that would be obvious to one of skill in the art having read the disclosure herein.

Provided herein are methods comprising providing a vehicle driveline comprising a variable transmission of any configuration described herein or that would be obvious to one of skill in the art having read the disclosure herein.

Provided herein are methods comprising providing a vehicle comprising a variable transmission of any configuration described herein or that would be obvious to one of skill in the art having read the disclosure herein.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Besides these transmissions, Continuously Variable Transmissions or CVTs have been developed. Those CVTs are of many types: belts with variable pulleys, toroidal, and conical, for non-limiting example. The principle of a CVT is that it enables the engine to run at its most efficient rotation speed by changing steplessly the transmission ratio in function of the speed of the car and the torque demand (throttle position) of the driver. If needed for example when accelerating, the CVT is configured to also shift to the most optimum ratio providing more power. A CVT is configured to change the ratio from the minimum to the maximum ratio without any interruption of the power transmission, as opposed to the opposite of usual transmissions which require an interruption of the power transmission by disengaging to shift from one discrete ratio to engage the next ratio.

A specific use of CVTs is the Infinite Variable Transmission or IVT. Where the CVT is limited to positive speed ratios, the IVT configuration is configured to perform a neutral gear and even reverse ratios steplessly. In some embodiments, a CVT is used as an IVT in some driveline configurations.

Figure 1:
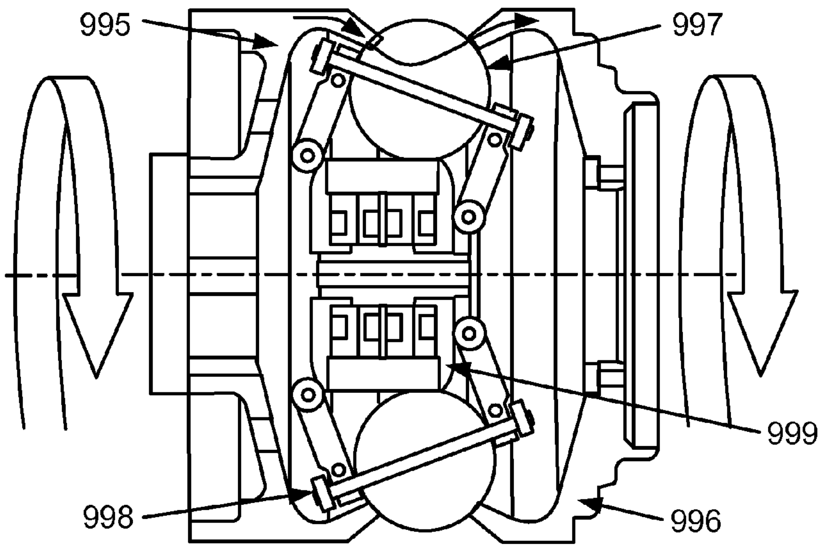
FIG. 1 is a side sectional view of a ball-type variator.
Figure 2:
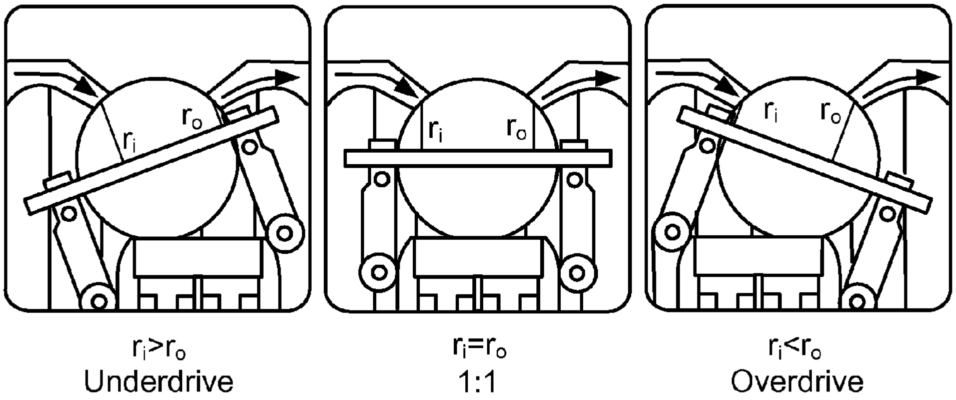
FIG. 2 is a magnified, side sectional view of a ball of a variator of FIG. 1 having a symmetric arrangement of a first ring assembly and a second ring assembly.

Provided herein are configurations of CVTs based on a ball type variators, also known as CVP, for constant variable planetary. Some general aspects of the CVTs and CVPs are described in US20060084549 or AU2011224083A1, incorporated herein by reference in their entirety. The type of CVT provided herein comprises a variator comprising a plurality of variator balls, depending on the application, two discs or annular rings 995, 996 each having an engagement portion that engages the variator balls 997, at least. The engagement portions are optionally in a conical or toroidal convex or concave surface contact with the variator balls, as input (995) and output (996). The variator optionally includes an idler 999 contacting the balls as well as shown on FIG. 1. The variator balls are mounted on axles 998, themselves held in a cage or carrier allowing changing the ratio by tilting the variator balls' axes. Other types of ball CVTs also exist like the one produced by Milner, but are slightly different. These alternative ball CVTs are additionally contemplated herein. The working principle generally speaking, of a ball-type variator (i.e. CVP) of a CVT is shown in FIG. 2.

The variator itself works with a traction fluid. The lubricant between the ball and the conical rings acts as a solid at high pressure, transferring the power from the first ring assembly (input of the variator), through the variator balls, to the second ring assembly (output of the variator). By tilting the variator balls' axes, the ratio is changed between input and output. When the axis of each of the variator balls is horizontal the ratio is one, when the axis is tilted the distance between the axis and the contact point change, modifying the overall ratio. All the variator balls' axles are tilted at the same time with a mechanism included in the cage.

Figure 3:
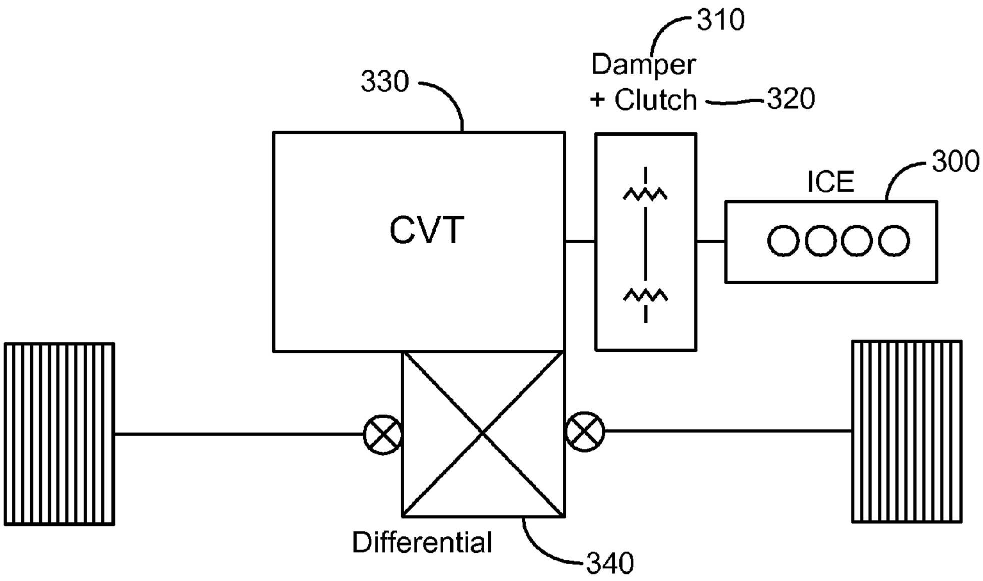
FIG. 3 is a block diagram of a continuously variable transmission (CVT) used in an automobile.

In a vehicle, the CVT 330 is used to replace traditional transmission and is located between the engine (ICE or internal combustion engine) 300 and the differential 340 as shown on FIG. 3. A torsional dampener (alternatively called a damper) 310 is optionally introduced between the engine and the CVT to avoid transferring torque peaks and vibrations that could damage the CVT. In some configurations this dampener is coupled with a clutch 320 for the starting function or for allowing the engine to be decoupled from the transmission. In some embodiments, the clutch is located at a different place in the driveline for allowing an interruption in the transmission of power in the driveline.

Provided herein is a variable transmission comprising: an input shaft; a variator (CVP) comprising a first ring assembly coupled to the input shaft, a carrier assembly comprising a plurality of tiltable variator balls drivingly engaged with the first ring assembly, and a second ring assembly drivingly engaged with the tiltable variator balls; and a planetary gearset comprising a planet carrier drivingly engaged with the input shaft, a ring drivingly engaged with the second ring assembly of the variator, and a sun gear drivingly engaged with the output of the vehicle, and wherein the planetary gearset is configured to split power of the input shaft between the variator and a mechanical path going directly to the output through the planetary gear set.

In some embodiments, the first ring assembly and the second ring assembly are drivingly coupled over a continuous range of speed ratios from a minimum speed ratio to a maximum speed ratio, and wherein the speed ratio is controlled by tiltable variator balls. In some embodiments, the variator controls the speed ratio between the two ring assemblies and thus between the planet carrier and ring of the planetary gearset. In some embodiments, a minimum speed ratio and a maximum speed ratio between the input shaft and sun of the planetary gearset span a range from negative to positive.

In some embodiments, the variable transmission comprises a dampener (or damper) coupled to the input shaft and disposed between a power source and the variable transmission.

In some embodiments, the variable transmission comprises a speed ratio shifter configured to shift a range of speed ratios to high or lower values. In some embodiments, the speed ratio shifter comprises a countershaft and gear drivingly engaged with the first ring assembly, the countershaft and gear having a gear ratio that changes the speed ratio between the input shaft and the second ring assembly. In some embodiments, shifting the range of speed ratios to higher ratios shifts the range of speed ratios between the planet carrier and sun of the planetary gearset to lower ratios. In some embodiments, the range of speed ratios is such that the range of ICE speed ratios spans a negative ratio to a positive ratio. The speed ratio shifter or the second speed ratio shifter may comprise a planetary gear set.

In some embodiments, the variator is an asymmetric variator. In some embodiments, the asymmetric variator perform as a speed ratio shifter. In some embodiments, the first ring assembly comprises a first ring assembly engagement portion that is drivingly engaged with the variator ball, and second ring assembly comprises a second ring assembly engagement portion that is drivingly engaged with the variator ball, and wherein the first ring assembly engagement portion is offset from the second ring assembly engagement portion such that the speed ratio is greater than 1 or less than 1 when the variator balls are not tilted.

In some embodiments, the variator comprises a traction fluid.

Provided herein is a vehicle driveline comprising: a power source, a variable transmission of any configuration described herein or that would be obvious to one of skill in the art having read the disclosure herein. In some embodiments, the variable transmission of the vehicle driveline is drivingly engaged with the power source, and a vehicle output drivingly engaged with the variable transmission.

In some embodiments, the power source is drivingly engaged with the vehicle output. In some embodiments, the vehicle driveline comprises a torsional dampener. In some embodiments, the vehicle driveline comprises a clutch. In some embodiments, the vehicle driveline comprises a variable transmission of any configuration described herein or that would be obvious to one of skill in the art having read the disclosure herein.

Provided herein is a method comprising providing a variable transmission of any configuration described herein or that would be obvious to one of skill in the art having read the disclosure herein.

Provided herein is a method comprising providing a vehicle driveline comprising a variable transmission of any configuration described herein or that would be obvious to one of skill in the art having read the disclosure herein.

Provided herein is a method comprising providing a vehicle comprising a variable transmission of any configuration described herein or that would be obvious to one of skill in the art having read the disclosure herein.

Provided herein are variable transmissions comprising: an input shaft; a variator (CVP) comprising a first ring assembly coupled to the input shaft, a carrier assembly comprising a plurality of tiltable variator balls drivingly engaged with the first ring assembly, and a second ring assembly drivingly engaged with the tiltable variator balls; and a planetary gearset comprising a planet carrier drivingly engaged with the input shaft, a ring drivingly engaged with the second ring assembly of the variator, and a sun gear drivingly engaged with the output of the vehicle, wherein the planetary gearset is configured to split power of the input shaft between the variator and a mechanical path going directly to the output through the planetary gear set. In some embodiments, the first ring assembly and the second ring assembly are drivingly coupled over a continuous range of speed ratios from a minimum speed ratio to a maximum speed ratio, and wherein the speed ratio is controlled by the tiltable variator balls. In some embodiments, the tiltable variator balls controls the speed ratio between the first ring assembly and second ring assembly of the variator, and thereby controls the speed ratio between the planet carrier and ring of the planetary gearset. In some embodiments, a minimum speed ratio and a maximum speed ratio between the input shaft and the sun of the planetary gearset span a range from negative to positive. In some embodiments, the variable transmission further comprises a damper coupled to the input shaft and disposed between a power source and the variable transmission. In some embodiments, the variable transmission further comprises a clutch disposed between the power source and the variable transmission. In some embodiments, the clutch is coupled to the damper or at a location to allow interrupting power transmission. In some embodiments, the variable transmission further comprises a speed ratio shifter configured to shift a range of speed ratios to high or lower values. In some embodiments, the speed ratio shifter comprises a countershaft and gear drivingly engaged with the first ring assembly, the countershaft and gear having a gear ratio that shifts the speed ratio between the input shaft and the second ring assembly. In some embodiments, the speed ratio shifter comprises a planetary gearset, a portion of which is grounded. In some embodiments, shifting the range of speed ratios to higher ratios shifts the range of speed ratios between the planet carrier and sun of the planetary gearset to lower ratios. In some embodiments, the range of speed ratios is such that the range of speed ratios between the input shaft and the sun or output spans a negative ratio to a positive ratio. In some embodiments, the range of speed ratios is such that the range of speed ratios between the input shaft and the sun or output spans a negative ratio to a positive ratio, the negative ratio having equal magnitude as the positive ratio. In some embodiments, the variable transmission further comprises a second speed ratio shifter configured to shift a range of speed ratios to high or lower values. In some embodiments, the second speed ratio shifter comprises a planetary gear set comprising a sun, a ring and a gear, one of which is grounded to create a speed ratio. In some embodiments, two of the sun, the ring, and the gear, are not grounded and are connected to the input shaft and the first ring assembly. In some embodiments, shifting the range of speed ratios to higher ratios shifts the range of speed ratios between the planet carrier and sun of the planetary gearset to lower ratios. In some embodiments, the range of speed ratios is such that the range of speed ratios between the input shaft and the sun or output spans a negative ratio to a positive ratio. In some embodiments, the range of speed ratios is such that the range of speed ratios between the input shaft and the sun or output spans a negative ratio to a positive ratio, the negative ratio having equal magnitude as the positive ratio. In some embodiments, the variator is an asymmetric variator. In some embodiments, the asymmetric variator performs the function of the speed ratio shifter. In some embodiments, the first ring assembly comprises a first ring assembly engagement portion that is drivingly engaged with the tiltable variator balls, and second ring assembly comprises a second ring assembly engagement portion that is drivingly engaged with the tiltable variator balls, and wherein the first ring assembly engagement portion is offset from the second ring assembly engagement portion such that the speed ratio is greater than 1 or less than 1 when the tiltable variator balls are not tilted. In some embodiments, the variator comprises a traction fluid.

Provided herein are vehicle drivelines comprising: a power source, any variable transmission of any configuration described herein or that would be obvious to one of skill in the art having read the disclosure herein drivingly engaged with the power source, and a vehicle output drivingly engaged with the variable transmission. In some embodiments, the power source is drivingly engaged with the vehicle output. In some embodiments, the vehicle driveline comprises a torsional dampener. In some embodiments, the vehicle driveline comprises a clutch.

Provided herein are vehicles comprising a variable transmission of any configuration described herein or that would be obvious to one of skill in the art having read the disclosure herein.

Provided herein are methods comprising providing a variable transmission of any configuration described herein or that would be obvious to one of skill in the art having read the disclosure herein.

Provided herein are methods comprising providing a vehicle driveline comprising a variable transmission of any configuration described herein or that would be obvious to one of skill in the art having read the disclosure herein.

Provided herein are methods comprising providing a vehicle comprising a variable transmission of any configuration described herein or that would be obvious to one of skill in the art having read the disclosure herein.

Example 1:

Some embodiments of the invention are directed to variable transmission configurations that includes a variator (alternatively called a CVP herein) and a planetary gearset that together are able to provide standstill and reverse functions (such as is possible in a typical IVT—infinitely variable transmission). As such, no starting device (like a slipping clutch or a torque converter) is required. Rather, the variable transmission configuration described herein, and shown in an embodiment configuration in FIG. 4, provides the starting function for the vehicle driveline powered by, for example, an engine.

Thus, certain embodiments of a variable transmission comprise a variator coupled to a planetary gear system. For example, in some embodiments, the planetary gearset is an epicyclic gearset. The planetary gearset comprises the carrier a plurality of planet gears, a sun gear, and a ring gear. The carrier, the sun gear, and the ring gear are rotatably disposed in the transmission housing. Each of the planet gears is rotatably disposed on the carrier and is drivingly engaged with the sun gear and the ring gear. The sun gear is drivingly engaged with the output of the transmission. The ring gear is drivingly engaged with the second variator ring assembly; however, it is understood that the ring gear is optionally integrally formed with the second ring assembly.

Figure 4:
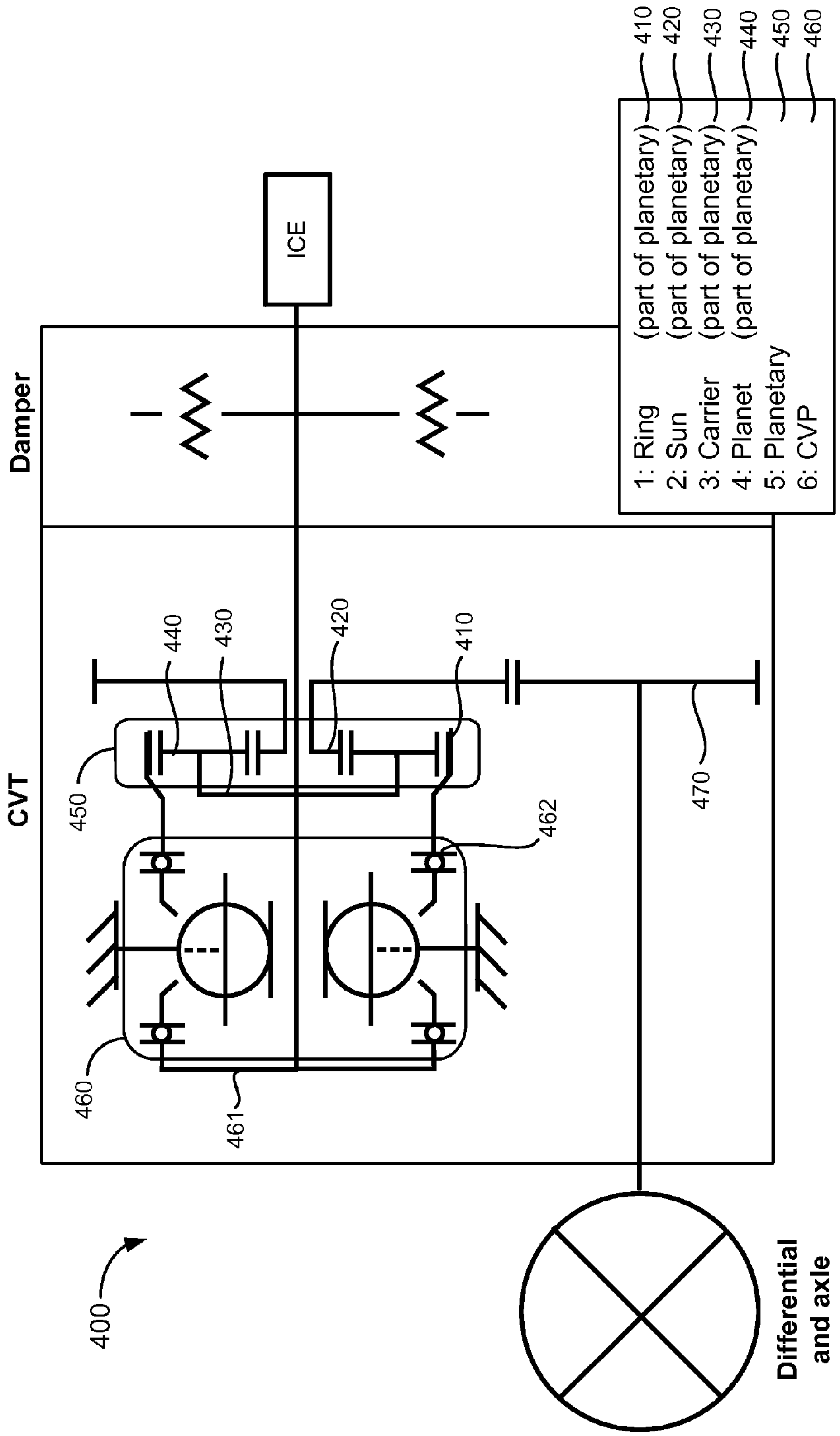
FIG. 4 is stick diagram of a power-splitting CVT configuration.
Figure 5:
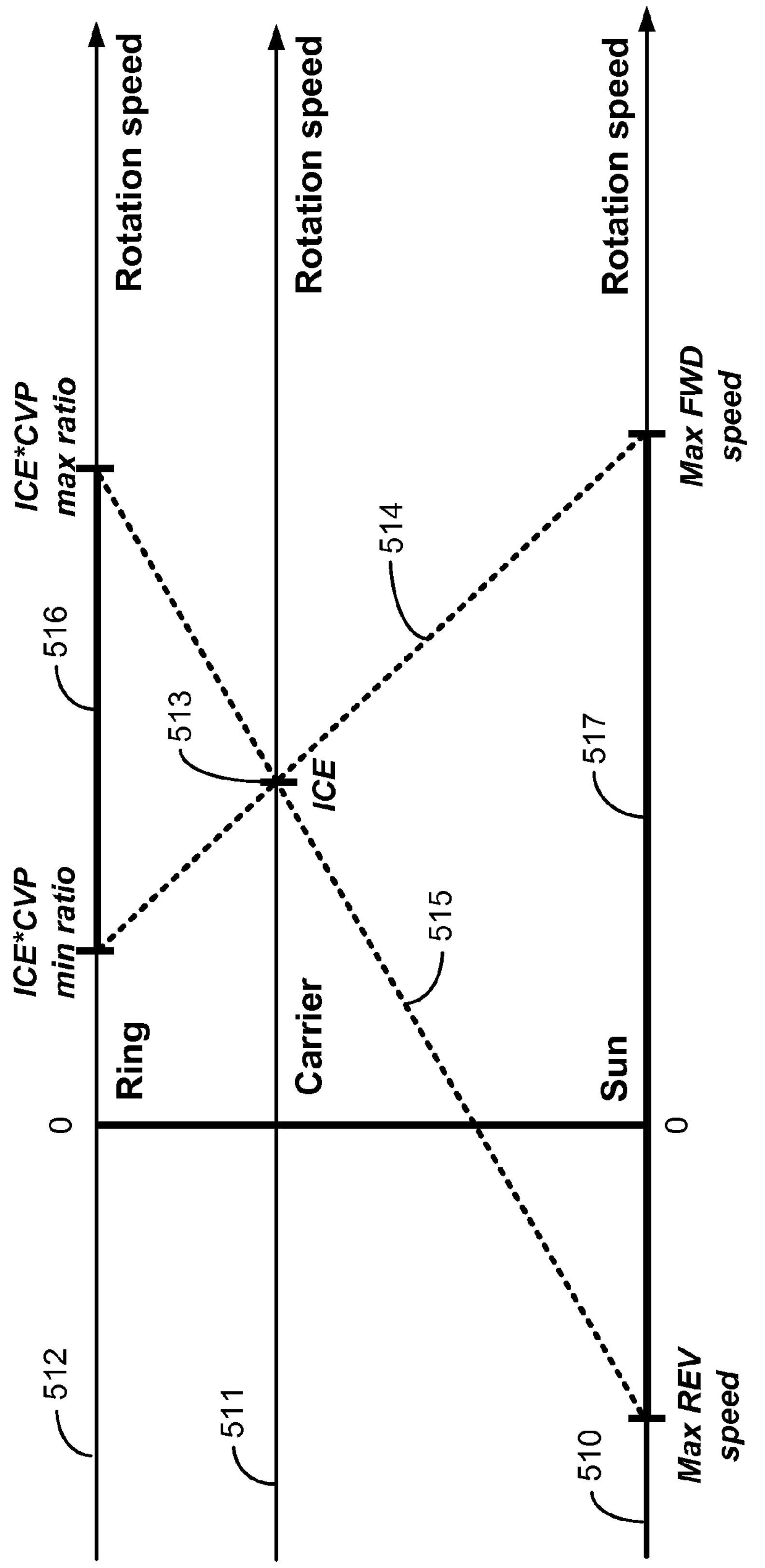
FIG. 5 is a graph of a speed diagram of the power-splitting CVT configuration in FIG. 4.

As shown in FIG. 4, an internal combustion engine (ICE) or any other power plant is coupled to a power-splitting CVT configuration 400 comprising a variator 460 at the first ring assembly (input ring) 461 of the variator and the planet carrier 430 of the planetary gearset 450. The output ring of the variator (second ring assembly) 462 is coupled to the ring 410 of the planetary gearset and the sun gear 420 of the planetary gearset is the output of the transmission and is coupled to the differential 470 and drive axle of the vehicle. The ICE is linked directly to the planet gears 440 through the carrier but also indirectly through ring via the variator. However the connection to the ring is subject to the speed ratio of the variator, though the variator controls the flow of power from the ICE through the planetary gearset. As shown in FIG. 5, by varying the variator speed ratio between the maximum and minimum capabilities for the variator the speed ratio between the ICE input and output is configured to change drastically over a continuum that includes both positive and negative values. This gives the ICE the ability to seamlessly achieve forward, neutral, and reverse gearing.

The three horizontal axes of FIG. 5 represent respectively, from the bottom to the top, the sun rotation speed 510, the planet carrier rotation speed 511 and the ring rotation speed 512. The planet carrier 430 is linked to the ICE and then always turns at the ICE speed, shown as a vertical bar 513 at the intersection of the crossing dotted lines 514, 515 on the carrier axis. The ring 410 is connected to the second ring assembly (output) 462 of the variator and is thus turning at a speed included between the ICE speed times the minimum ratio of the CVP (variator) and the ICE speed times the maximum speed ratio of the CVP (variator). This speed interval 516 is shown on the top horizontal axis beginning to the right of zero beneath ICE*CVP min ratio label extending to the right beneath the ICE*CVP max ratio label on the ring axis.

The highlighted interval 517 along the lower horizontal axis, representing the Sun's Rotation speed, which extends from just above the Max REV Speed to the Max FWD speed in FIG. 5 shows the speed achievable by the sun depending on the variator speed ratio. A minimum speed ratio in the variator brings the sun speed to its maximum while the maximum speed ratio in the CVP brings the sun speed to its maximum negative speed. The area comprised in between the dotted lines 514, 515 can be completely covered by only changing the speed ratio in the CVP. It can be observed that the amount of positive speeds achievable with that configuration is bigger than the negatives ones.

This configuration is a power split configuration, meaning that there are multiple power paths that will be used at the same time. A part of the power will flow through the CVP (variator), the planetary ring, planet and going out through the sun while a certain amount of the power will directly flow through the carrier, planets and sun of the planetary.

Example 2

Figure 6:
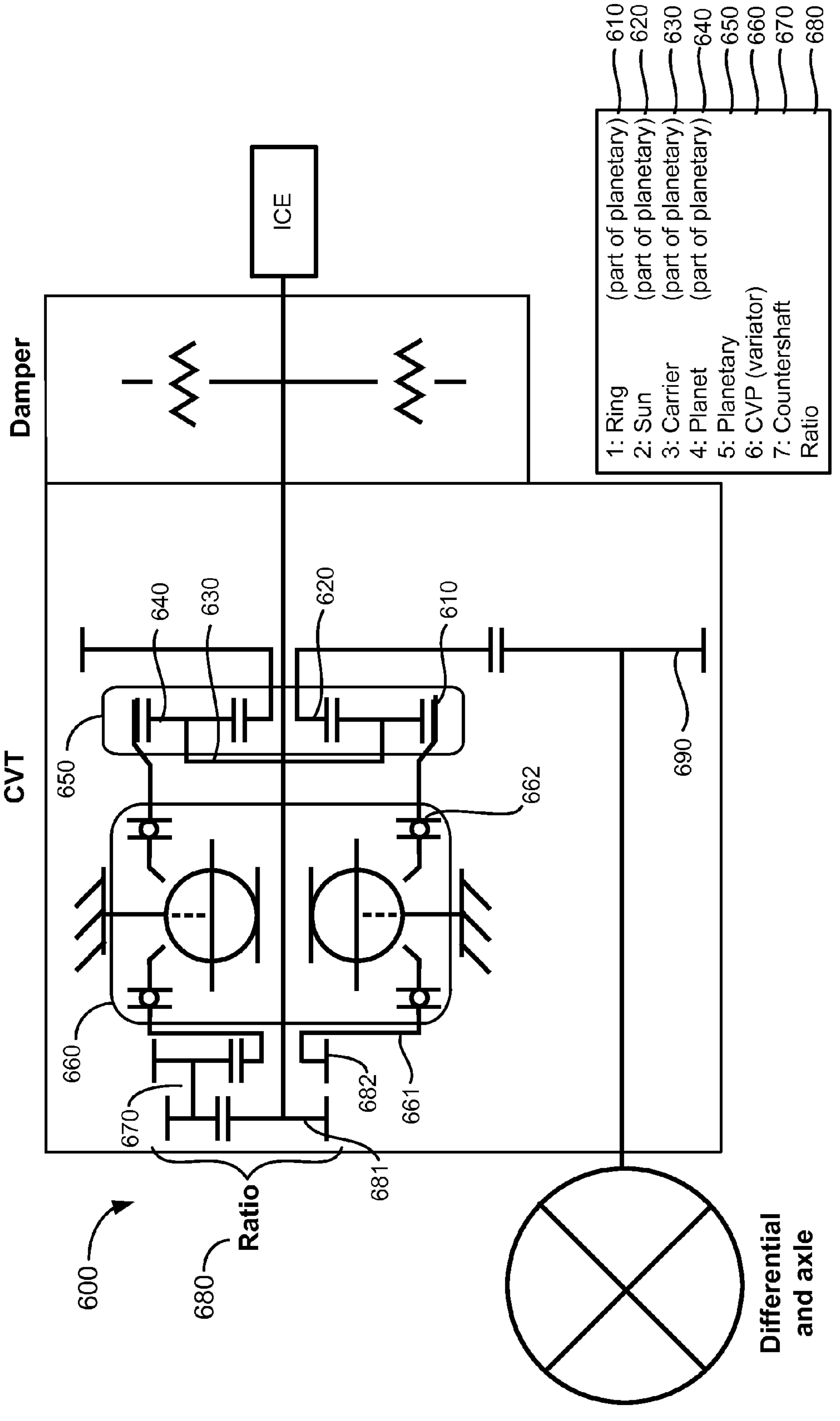
FIG. 6 is a stick diagram of a power-splitting CVT drivetrain variant with a gear ratio coupled to the first ring assembly of the variator.

A variant of the previous example comprises a gear ratio at the first ring assembly (input) of the variator, for example, as shown in FIG. 6. As with Example 1, this configuration 600 uses a planetary gearset 650 to provide different power paths and a gear ratio 680 before the first ring assembly 661 of the variator 660. Thanks to the planetary gearset, the configuration uses only a variator yet is able to provide standstill and reverse function as an infinitely variable transmission would. No starting device like a slipping clutch or torque converter is required, since the infinitely variable transmission of the embodiment CVT described in this example, at least, takes care of the starting function. The added gear ratio gives the ability to increase the coverage of reverse speeds and also decreases the torque on the variator.

Adding a gear ratio 680 greater than 1 to the input of the variator (the input to the variator depicted on the left of the variator 660 in FIG. 6) shifts the planetary gear set 650 min speed and planetary gear set max speed higher levels. Indeed, the speed ratios are the same, but multiplied by a value greater than one. This has the effect of changing the output speed range (as reflected by the planetary sun gear's rotation) to lower levels. The effect is magnified by the planetary carrier/sun gear ratio allowing much more negative speed than before. Some embodiments of the invention feature a gear ratio mechanically placed on the other side of the CVP (but still linked to the first ring assembly or input of the variator) for the purpose of changing the overall speed/gear ratio range of the transmission.

Thus, the embodiment 600 of FIG. 6 includes an ICE drivingly engaged with a planet carrier 630 of a planetary gearset 650. The ICE is linked directly to the planet gears 640 through the carrier but also indirectly through the ring gear 610 via the variator 660. A gear ratio 680 comprises a gear 681 on the input shaft, a counter shaft 670 and a gear 682 on the input ring (first ring assembly) 661 of the variator 660. Note that this gear ratio is optionally obtained with another layout such as a planetary of which one of the elements is fixed. This gear arrangement is presented to provide a first speed ratio between the ICE and the first ring assembly without changing the rotation direction between the ICE and the first ring assembly. The variator second ring assembly 662 is then connected to the ring 610 of the planetary gearset 650. The sun 620 of the planetary gearset is directly connected to an output of the transmission 690, which itself is linked to the differential and the wheel axle in a vehicle driveline embodiment.

Figure 7:
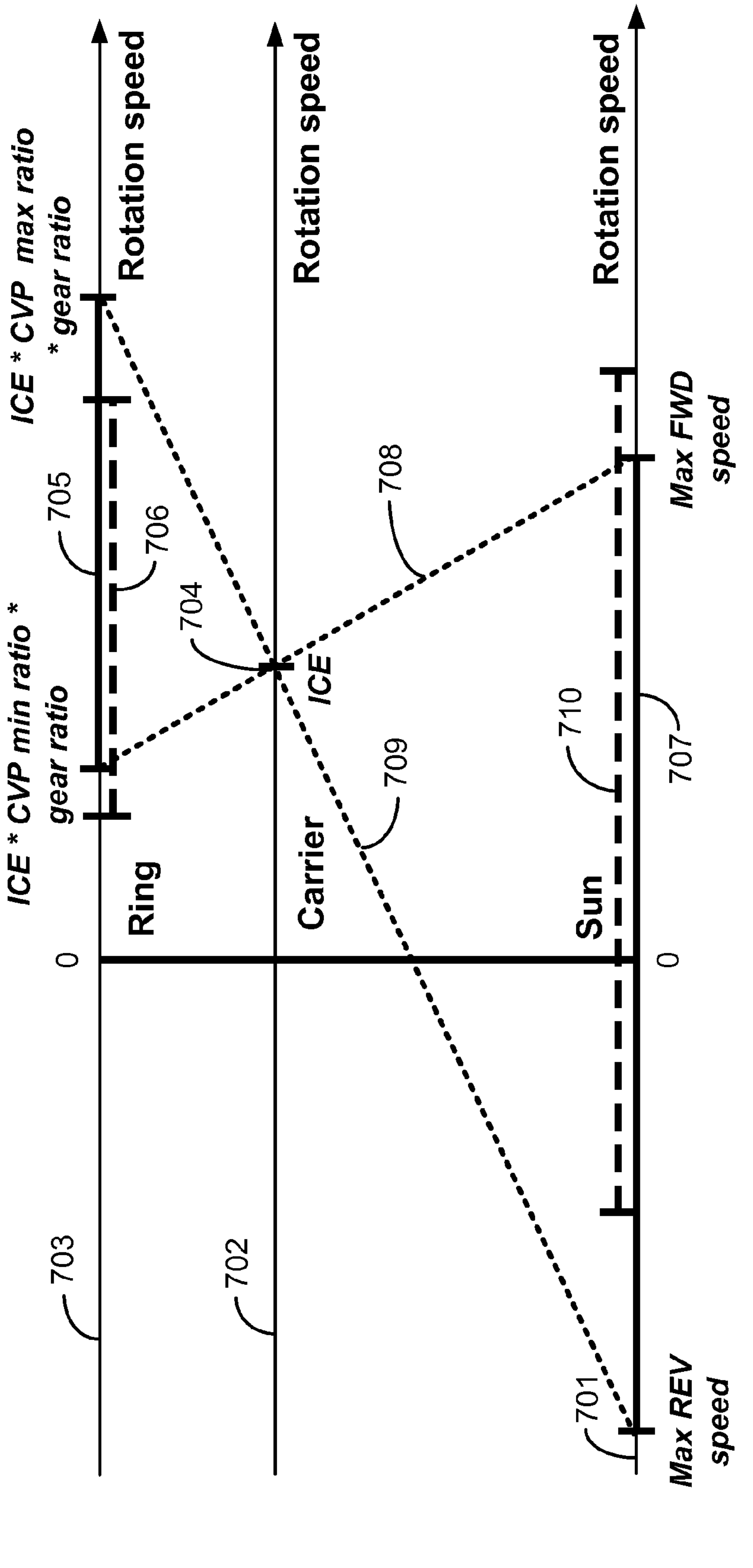
FIG. 7 is a power split variant configuration speed diagram showing the effect of coupling the gear ratio to the first ring assembly of the variator.

FIG. 7 depicts a speed diagram of the power split embodiment depicted in FIG. 6.

The three horizontal axes represent respectively, from the bottom to the top, the sun rotation speed 701, the planet carrier rotation speed 702 and the ring rotation speed 703. The planet carrier 630 is linked to the ICE and then always turns at the ICE speed, shown as a small dotted lines 704 crossing on the carrier axis. The ring 610 is connected to the second ring assembly (output) 662 of the variator (CVP) 660 and is thus turning at a speed included in the following interval [ICE*CVP min Ratio*Gear speed ratio; ICE*CVP max Ratio*Gear speed ratio]. This speed interval 705 is shown on the top horizontal axis starting just to the right of the first vertical bar crossing the axis, under the ICE*CVP min ratio*gear ratio label, and extending to the right past the third, 3rd, vertical bar crossing the ring axis ending above the "R" of the Rotation speed label on the ring axis. For reference, the dotted line 706 shown just below the ring axis shows the interval without gear ratio as it was in the previous example (Example 1).

The solid line 707 along the lower horizontal axis, representing the Sun's Rotation speed, which extends from just above the Max REV Speed label to the Max FWD speed label on the sun axis shows the speed achievable by the sun depending on the variator speed ratio. A minimum speed ratio in the variator brings the sun speed to its maximum while the maximum speed ratio in the CVP brings the sun speed to its maximum negative speed. The area comprised in between the small dotted lines 708, 709 can be completely covered by only changing the speed ratio in the CVP. Thanks to this design, the amount of negative speeds can be increased compared to the previous configuration. Such a feature is important in some applications such as Off-Highway applications in which the requirements include the same magnitude of positive and negative speeds. For reference, the other dotted line 710, shown just above the sun axis shows the interval without gear ratio as it was in the previous example (Example 1).

The ratio at the input of the CVP is optionally configured or set according to the specifications of the vehicle. It has to be understood that this ratio is optionally bigger than 1 or smaller than 1. A speed ratio bigger than one increases the speed of the variator input ring while a gear speed ratio smaller than one decreases the speed of the variator input ring. Similarly, the counter shaft is optionally omitted if the objective is to reverse the speed of the variator input ring.

The embodiments of Example 1 and 2 are power split configurations, meaning that there are multiple power paths that will be used at the same time. A part of the power will flow through the variator, the planetary ring, planet and going out through the sun, while a certain amount of the power will directly flow through the carrier, planets and sun of the planetary gearset. Such configurations of power splitting variable transmissions (CVTs) allow, for instance, an ICE with the capability to go just as fast in forward gearing as in reverse. In some embodiments, coupling a gear ratio to the variator (CVP) is accomplished with gears and countershafts. However it is desirable to not complicate the hardware of the transmission more than necessary.

Example 3

Figure 8:
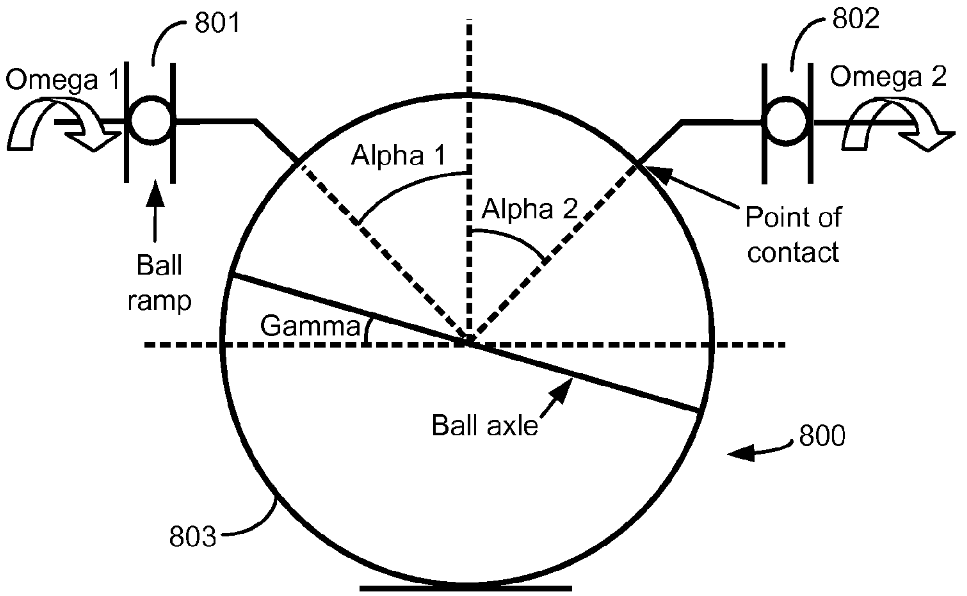
FIG. 8 depicts angles in a symmetric embodiment variator.

An internal speed ratio is alternatively created using an asymmetric variator rather than the power split configurations of Example 1 and Example 2. Such a configuration eliminates need for the ratio gears and countershaft or planetary gear set of Example 2, thus reducing the parts of the overall variable transmission while providing the same functionality. Additionally, an asymmetric variator that changes alpha angles (described elsewhere herein) could be used in many other cases, increasing the spread, or giving better efficiency for a certain range of speed ratios Thus, some embodiments of a variable transmission that includes a biasing gear ratio on the variator. This is optionally achieved by modifying the variator to produce an asymmetric variator design. FIG. 8 shows a standard ball variator 800 used in the variable transmission. The first ring assembly 801 (input ring) and second ring assembly 802 (output ring) are mechanically coupled to each variator ball 803 at two points. The first ring assembly turns at a speed Omega 1 around the horizontal while the second ring assembly turns at a speed Omega 2 around the horizontal. The angle between the ball axle and the horizontal is called Gamma and the angle between the normal to the contact patch of the first ring assembly and the vertical is called Alpha 1 while the angle between the normal to the contact patch of the second ring assembly and the vertical is called Alpha 2. In some variators, Alpha 1 is the same as Alpha 2 and the speed ratio given by $$SR = \frac{\text{Omega}_2}{\text{Omega}_1} = \frac{\cos(\text{Alpha}_2 - \text{Gamma})}{\cos(\text{Alpha}_1 + \text{Gamma})} = 1 \text{ when the ball is not tilted (gamma} = 0).$$

Figure 9:
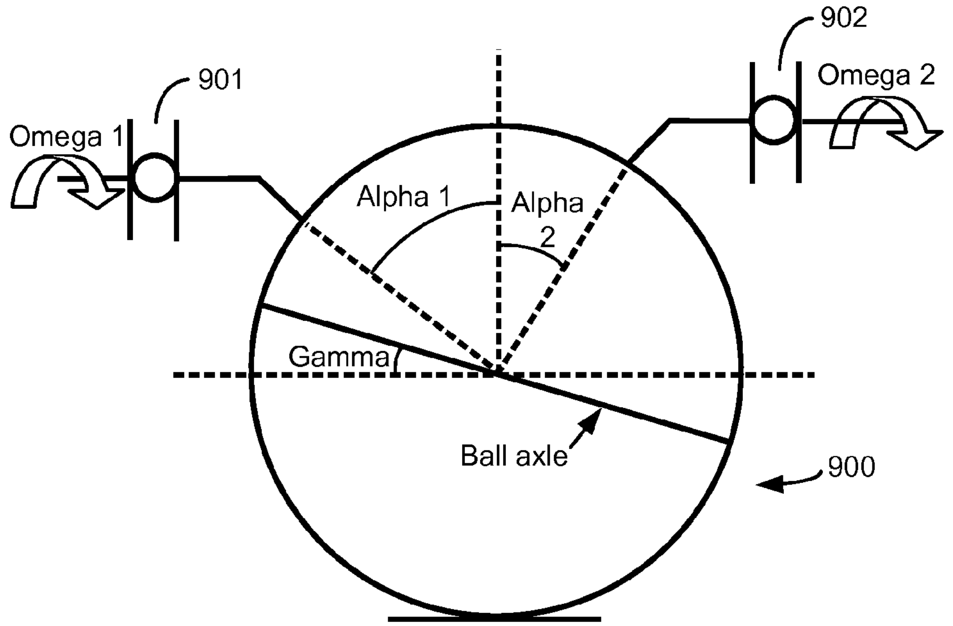
FIG. 9 depicts angles in an asymmetric embodiment variator.
Figure 10:
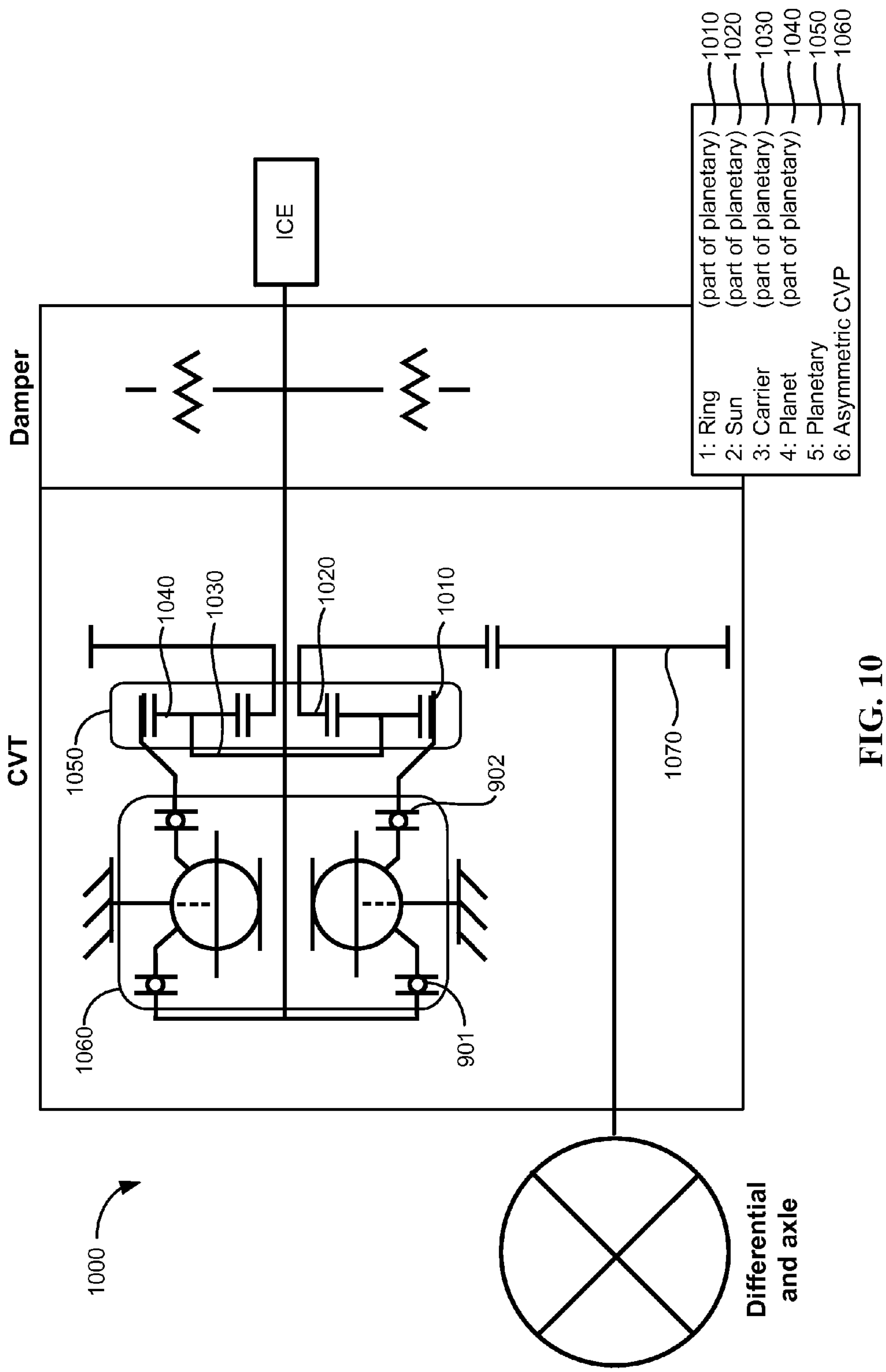
FIG. 10 shows a stick diagram of a power splitting configuration using an asymmetric variator.
Figure 11:
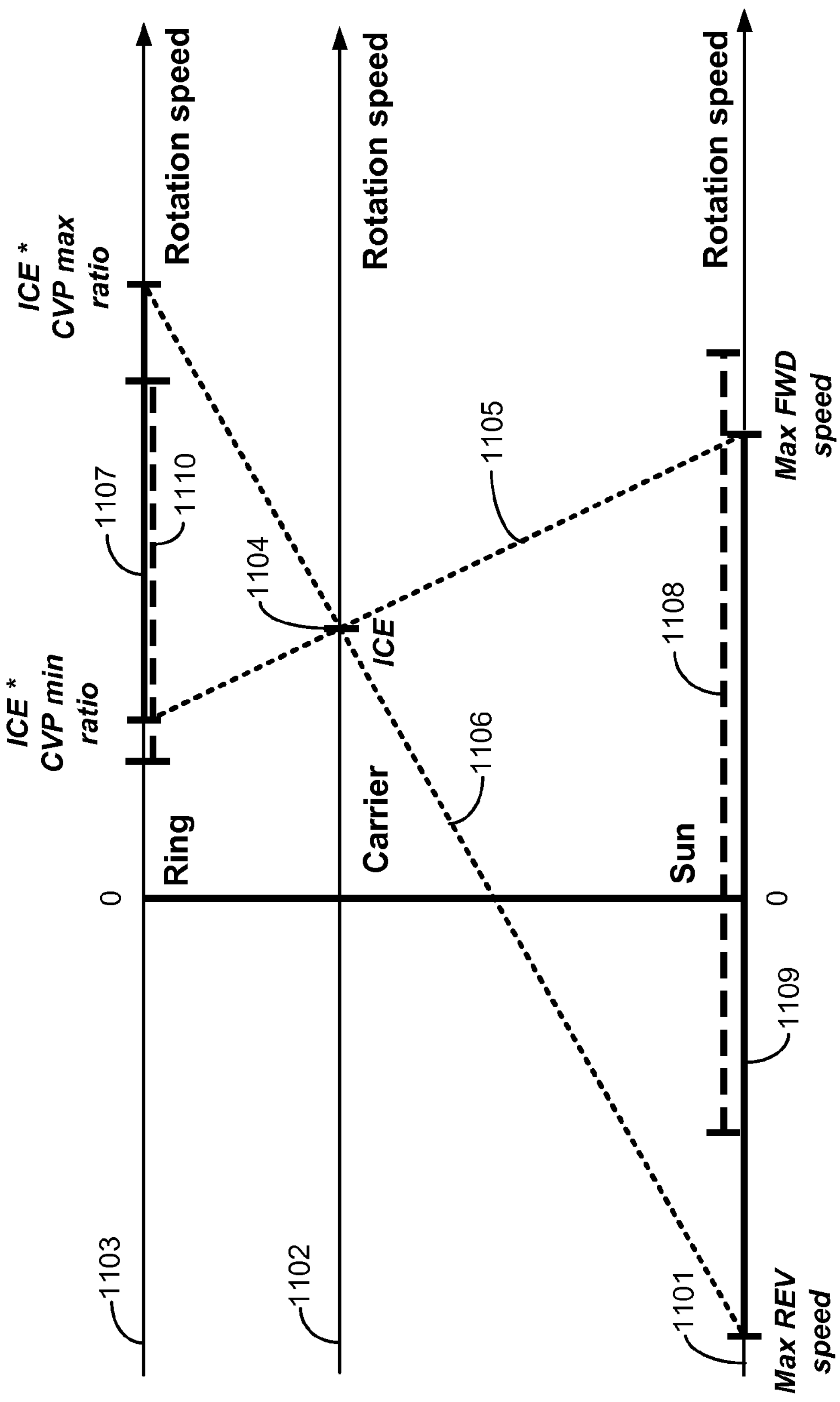
FIG. 11 is a speed diagram showing the effect of the asymmetric variator on the system of FIG. 10.

Provided herein is an alternative variator 900, and variable transmission employing such a variator, which uses different angles Alpha 1 and Alpha 2, as shown on FIG. 9. In such an arrangement, the speed ratio is no longer 1 when gamma=0. Such an embodiment is an asymmetric variator (asymmetric CVP). The geometry of the variator now favors a SR (speed ratio) greater or less than 1. In effect, its range of attainable speed ratio shift being dependent upon which is greater-Alpha 1 or Alpha 2. If Alpha 1 is greater than Alpha 2 then the speed ratio range shifts to faster values and vice versa. In some embodiments, an asymmetric variator (asymmetric CVP) is used to alter the overall gearing range of the ICE without the use of extra gearing. FIG. 10 and FIG. 11 depict a power splitting driveline configuration with an asymmetric variator. Modifying the variator speed ratio range has the same effect as seen in FIG. 7, of broadening and lowering the output rotation speed range.

The embodiment 1000 of FIG. 10 comprises a planetary gearset 1050 to provide different power paths. The central part of the configuration of FIG. 10 is the variator 1060 described previously in the document with an asymmetric design 900 of the first ring assembly 901 (variator input ring) and second ring assembly 902 (variator output ring).

As shown in FIG. 10, an internal combustion engine (ICE) or any other power plant is coupled to a power-splitting CVT configuration 1000 comprising an asymmetric variator 1060 at the first ring assembly (input ring) 901 of the variator and the planet carrier 1030 of the planetary gearset 1050. The output of the asymmetric variator 902 is coupled to the ring 1010 of the planetary gearset and the sun gear 1020 of the planetary gearset is the output of the transmission and is coupled to the differential 1070 and drive axle of the vehicle. The ICE is linked directly to the planet gears 1040 through the carrier but also indirectly through ring 1010 via the asymmetric variator 1060. However the connection to the ring is subject to the speed ratio of the variator. Through the variator controls the flow of power from the ICE through the planetary gearset.

A ball ramp on each side of the variator provides the clamping force necessary to transfer the torque. Due to the planetary gearset, the configuration of FIG. 10 uses only a variator (no gear ratio elements) and is able to provide standstill and reverse function as an IVP. No starting device like a slipping clutch or torque converter is required, since the IVP capability takes care of the starting function. FIG. 11 shows the speed diagram of the embodiment of FIG. 10, which is similar to the speed diagram in FIG. 9.

The three horizontal axes of FIG. 11 represent respectively, from the bottom to the top, the sun rotation speed 1101, the planet carrier rotation speed 1102 and the ring rotation speed 1103. The planet carrier 1030 is linked to the ICE and then always turns at the ICE speed, shown as a vertical bar 1104 where the small dotted lines 1105, 1106 intersect on the carrier axis. The ring is connected to the output 902 (second ring assembly) of the CVP 1060 and is thus turning at a speed included in the following interval [ICE*CVP min Ratio; ICE*CVP max Ratio]. This speed interval 1107 is shown on the top horizontal axis starting just to the right of the first vertical bar crossing the axis, under the ICE*CVP min ratio*gear ratio label, and extending to the right pat the third, 3rd, vertical line crossing the ring axis ending above the "R" of the Rotation speed label on the ring axis. For reference, the other dotted line 1108 shown just above the sun axis shows the interval for a symmetric CVP as it was in Example 1 (FIG. 7).

The solid interval 1109 on the sun axis shows the speed achievable on the sun depending on the variator speed ratio. A minimum speed ratio in the variator brings the sun speed to its maximum while the maximum speed ratio in the variator brings the sun speed to its maximum negative speed. The area comprised in between the dotted lines 1105, 1106 can be completely covered by only changing the speed ratio in the CVP. Thanks to this design, the amount of negative speeds can be increased compared to the previous configuration of Example 1. Such a feature is important in some applications such as Off-Highway applications in which the requirements include the same magnitude of positive and negative speeds. For reference, the dotted line 1110 on the ring axis shows the interval without gear ratio as it was in Example 1.

This configuration is a power split configuration, meaning that there are multiple power paths that will be used at the same time. A part of the power will flow through the variator, the planetary ring, planet and going out through the sun while a certain amount of the power will directly flow through the planet carrier, planets and sun of the planetary gearset.

The ICE in the embodiment of FIG. 10 is connected to the planet carrier 1030 of the planetary 1050 and to the input ring 901 (first ring assembly) of the CVP 1060. Additionally, the ICE is linked directly to the planet gears 1040 through the carrier but also indirectly through ring 1010 via the asymmetric variator 1060. The variator output ring 902 (second ring assembly) is then connected to the ring 1010 of the planetary 1050. The sun 1020 of the planetary is directly connected to the output 1070 of the transmission, itself linked to the differential and the wheel axle.

Embodiments of the variable transmission described herein or that would be obvious to one of skill in the art upon reading the disclosure herein, are contemplated for use in a variety of vehicle drivelines. For non-limiting example, the variable transmissions disclosed herein is used in bicycles, mopeds, scooters, motorcycles, automobiles, electric automobiles, trucks, sport utility vehicles (SUV's), lawn mowers, tractors, harvesters, agricultural machinery, all terrain vehicles (ATV's), jet ski's, personal watercraft vehicles, airplanes, trains, helicopters, buses, forklifts, golf carts, motorships, steam powered ships, submarines, space craft, or other vehicles that employ a transmission.

While the figures and description herein are directed to ball-type variators (CVTs), alternate embodiments are contemplated another version of a variator (CVT), such as a Variable-diameter pulley (VDP) or Reeves drive, a toroidal or roller-based CVT (Extroid CVT), a Magnetic CVT or mCVT, Ratcheting CVT, Hydrostatic CVTs, Naudic Incremental CVT (iCVT), Cone CVTs, Radial roller CVT, Planetary CVT, or any other version CVT.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein are optionally employed in practicing the invention. It is intended that the following claims define the scope of the invention and that methods and structures within the scope of these claims and their equivalents be covered thereby.

What is claimed is:

1. A variable transmission comprising:

an input shaft;

a gear ratio comprising a first gear coupled to the input shaft, a countershaft and a second gear coupled to the countershaft;

a variator (CVP) comprising a first ring assembly coupled to the second gear on the countershaft, a carrier assembly comprising a plurality of tiltable variator balls, each ball drivingly engaged with the first ring assembly, and a second ring assembly drivingly engaged with the tiltable variator balls; and a planetary gearset comprising a planet carrier drivingly engaged with the input shaft, a ring gear drivingly engaged with the second ring assembly of the variator, and a sun gear drivingly engaged with an output;

wherein the planetary gearset is configured to split power of the input shaft between the variator and a mechanical path going directly to the output.

2. The variable transmission of claim 1, wherein the first ring assembly and the second ring assembly are drivingly coupled over a continuous range of speed ratios from a minimum speed ratio to a maximum speed ratio, and wherein the speed ratio is controlled by the tiltable variator balls.

3. The variable transmission of claim 1, wherein the tiltable variator balls controls a first speed ratio between the first ring assembly and second ring assembly of the variator, and thereby controls a second speed ratio between the planet carrier and ring gear of the planetary gearset.

4. The variable transmission of claim 1, wherein a minimum speed ratio and a maximum speed ratio between the input shaft and the sun gear of the planetary gearset span a range from negative to positive.

5. The variable transmission of claim 1, further comprising a damper coupled to the input shaft and disposed between a power source and the variable transmission.

6. The variable transmission of claim 5, further comprising a clutch disposed between the power source and the variable transmission.

7. The variable transmission of claim 6, wherein the clutch is coupled to the damper or at a location to allow interrupting power transmission.

8. The variable transmission of claim 1, wherein the variator comprises a traction fluid.

9. The variable transmission of claim 1, wherein the gear ratio is configured to operate with reverse speeds.

10. The variable transmission of claim 1, wherein the gear ratio decreases torque on the variator.

11. The variable transmission of claim 1, wherein the gear ratio provides a first speed ratio between a power source and the first ring assembly without changing the rotation direction between the power source and the first ring assembly.

12. The variable transmission of claim 1, wherein when the gear ratio is greater than 1 to the input of the variator, the minimum and maximum speeds of the planetary gearset are increased.

13. The variable transmission of claim 1, wherein when the gear ratio is less than 1 to the input of the variator, the minimum and maximum speeds of the planetary gearset are decreased.

14. A vehicle driveline comprising: a power source, a variable transmission of claim 1 drivingly engaged with the power source, and a vehicle output drivingly engaged with the variable transmission.

15. A method comprising providing a vehicle driveline of claim 14.

* * * * *